3,280,186
CATALYZED UREA ALKYLATION
Thomas F. Rutledge, Wilmington, Del., assignor to Atlas Chemical Industries, Inc., Wilmington, Del., a corporation of Delaware
No Drawing. Filed Feb. 4, 1965, Ser. No. 430,482
16 Claims. (Cl. 260—553)

The invention relates to a process for the preparation of mono-alkyl ureas and more particularly, to an improved catalytic process for the mono-alkylation of urea by reaction with tertiary mono-olefins.

It is known that urea can be reacted with tertiary olefins to yield a mixture of N-t-alkyl and N,N'-di-t-alkyl urea. The reaction is usually carried out in the presence of sulfuric acid. It is also known that the amount of sulfuric acid required can be reduced by conducting the alkylation in the presence of an iron salt. Regardless of whether the reaction is carried out in the presence of sulfuric acid or a mixture of sulfuric acid and an iron salt, the reaction product is a mixture of N-t-alkyl urea and a large amount of N,N'-di-t-alkyl urea. It would be highly desirable to carry out the alkylation of urea with tertiary olefins under conditions which yield only mono-alkyl urea and substantially no di-alkyl urea.

Accordingly, it is an object of the present invention to provide a novel and improved method for the alkylation of ureas.

Another object is to increase the proportion of mono-alkyl urea relative to the di-alkyl urea produced in the alkylation of urea with olefins.

A further object is to provide novel catalysts for the alkylation of urea with tertiary olefins.

The above and other objects of the invention will be apparent in the following description and in the appended claims.

These objects are accomplished, in accordance with the present invention, by using catalytic amounts of an ionic metal salt, the cation of which is $Li^+$, $Na^+$, $Cu^{++}$, $Zn^{++}$, $Cd^{++}$, $Al^{+++}$, $Ti^{++++}$, $Sn^{++}$, $Cr^{+++}$, $Ni^{++}$, $Mn^{++}$, $Co^{++}$, or $Pt^{++++}$, in the alkylation of urea with tertiary olefins.

The directive effect of the catalysts toward the formation of mono- rather than di-alkyl ureas is obtained when alkylating with any mono-olefin which contains a tertiary olefinic carbon atom. Preferred olefins for alkylating urea in accordance with the invention are those tertiary mono-olefins in which carbon atoms alpha and beta to the tertiary olefinic carbon atom are either primary or secondary, that is, unhindered olefins which conform to the formula

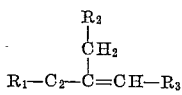

where $R_1$, $R_2$ and $R_3$ are independently selected from the group consisting of —H, —$CH_3$, —$CH_2CH_3$, and —$CH_2R_4$, $R_4$ being alkyl. Such olefins include, for example, isobutylene, 2-methyl-1-pentene, 2-methyl-2-butene, 2-methyl-1-butene, 2-methyl-2-pentene, 3-methyl-2-pentene, 2-methyl-1-hexene, 2-methyl-2-hexene, and the like. A particularly preferred olefin is isobutylene. The amount of olefin used is not critical. However, sufficient olefin should be used to obtain substantial nitrogen utilization and the production of desirable yields of N-t-alkyl urea. The olefin:urea ratio should be at least about 1 and preferably at least about 2. Any unreacted olefin is easily recovered and recycled.

The reaction medium in which the alkylation is carried out contains sulfuric acid and usually a diluent which is inert toward the olefin and urea in strongly acid solutions. The amount of sulfuric acid employed may vary widely provided that at least one mol per mol of urea is supplied. However, since one of the major cost items in the olefin-urea reaction is sulfuric acid and the ammonia required to neutralize it, in the recovery process, the lower the amount of sulfuric acid charged, the less ammonia required, and the lower the cost. Therefore, the sulfuric-acid: urea ratio should be 1.0 to 2.0, preferably 1.0 to 1.5. The concentration of the sulfuric acid should be at least about 75 weight percent and preferably at least about 90 weight percent. The diluent usually comprises at least half the reaction mixture and can be any diluent which is inert toward the olefin and urea. A mixture of such diluents can also be employed. Hydocarbons containing up to eight carbon atoms and chlorinated alkanes containing no more than three carbon atoms are particularly useful. A preferred group of diluents are those boiling below about 150° C., such as cyclohexane, xylene, benzene, hexane, carbon tetrachloride, and methylene dichloride. The preferred diluents are methylene dichloride and cyclohexane.

Catalysts which direct the alkylation reaction preferentially toward mono-alkylation are ionic metal salts, the cation of which is $Li^+$, $Na^+$, $Cu^{++}$, $Zn^{++}$, $Cd^{++}$, $Al^{+++}$, $Ti^{++++}$, $Sn^{++}$, $Cr^{+++}$, $Ni^{++}$, $Mn^{++}$, $Co^{++}$, or $Pt^{++++}$. The metal salt may be any ionic metal compound which will yield the above recited ions. Although different salts of the same cation show some variation in catalytic activity, there does not appear to be any criticality with respect to the anion. An exemplary list of catalysts includes lithium sulfate, lithium acetate, cupric sulfate, cupric chloride, sodium sulfate, nickel chloride, zinc sulfate, zinc chloride, zinc acetate, cadmium sulfate, aluminum chloride, aluminum sulfate, titanium dioxide, stannous chloride, chromic sesqui oxide ($Cr_2O_3$), manganous acetate, manganous sulfate, manganous chloride, cobaltous sulfate, chloroplatinic acid, or the like. The amount of catalyst charged to the reactor is not critical. Generally, catalytic quantities of from about 0.1 to about 3 mole percent, preferably about 1 mole percent, based on urea, are used. It is understood, of course, that when the catalyst is to be used in the sulfate form, the metal if above hydrogen in the electromotive series, may be added directly to the reactor and the metal sulfate formed in situ by reaction of the metal with the sulfuric acid present in the reactor.

In the following examples, except as otherwise expressly indicated, the following procedure was employed. 0.5 mole of urea was finely ground and placed in the reactor and 200 ml. of diluent was added. The reactor was flushed with dry nitrogen and the stirrer turned on. A cooling bath was placed around the reactor and the temperature lowered to 5–10° C. The temperature of the cooling bath was held a few degrees lower than the temperature of the reactor. The indicated amount of sulfuric acid was added dropwise over a period of fifteen minutes from a dropping funnel with a pressure equalizing side arm. The cooling bath was removed, and stirring continued as the temperature was allowed to rise to 25–30° C. The catalyst was added as a solution in the sulfuric acid, or if insoluble in the sulfuric acid, catalyst was added at this point. Stirring was continued for a total of ¾ hour (after completion of acid addition), or a total of one hour from the start of sulfuric acid addition. At the end of this stirring period, the temperature was adjusted to the indicated reaction temperature and addition of olefin was started. Gaseous olefins were metered through capillary flow meters, and liquid olefins were added from a calibrated dropping funnel equipped with a pressure equalizing side arm. At the end of the desired reaction time, the olefin addition was stopped, and stirring was continued for ¼ hour to consume excess dissolved olefin. Water was then added to the mixture to dilute the sulfuric acid and stop any reaction still taking place. The aqueous layer was separated and neutralized to pH 8-9 with concentrated ammonium hydroxide at 25° C. The precipitate was removed and air dried at room temperature. The dried solid was treated with 1 ml. of ethanol and 5 ml. of water per gram of solid and the slurry heated to boiling and filtered hot. The filter cake contained N,N'-di-t-alkyl urea. The first crop of N-t-alkyl urea was obtained by cooling the filtrate to about 20° C. and filtering. The filtrate from the first crop of N-t-alkyl urea was concentrated to 100 ml. at 100° C. and then cooled to 20° C. to obtain a second crop of N-t-alkyl urea. The second crop of N-t-alkyl urea was generally 10-20% as large as the first crop.

urea in strong sulfuric acid solution and in the presence of a catalytic amount of an ionic metal salt, the cation of which is selected from the group consisting of $Li^+$, $Na^+$, $Cu^{++}$, $Zn^{++}$, $Cd^{++}$, $Al^{+++}$, $Ti^{++++}$, $Sn^{++}$, $Cr^{+++}$, $Ni^{++}$, $Mn^{++}$, $Co^{++}$, and $Pt^{++++}$.

3. The process of claim 2 wherein the molar ratio of sulfuric acid to urea is from 1.0 to 2.0.

4. The process for preparing mono alkyl urea which comprises contacting an unhindered tertiary olefin with urea in a medium comprising sulfuric acid and a diluent which is inert towards olefins and urea in strong sulfuric acid solution and in the presence of a catalytic amount of an ionic salt, the cation of which is selected from the group consisting of $Li^+$, $Na^+$, $Cu^{++}$, $Zn^{++}$, $Cd^{++}$, $Al^{+++}$,

| Ex. No. | Charge | | | | | | Conditions | | | Percent Theory Based on Urea | |
|---|---|---|---|---|---|---|---|---|---|---|---|
| | $H_2SO_4/$ Urea, moles | $H_2SO_4$ Conc., Percent | Moles i-$C_4H_8$ | Diluent | Catalyst | Mole Percent on Urea | Reactor | Time, Hours | T., °C. | Mono | Di |
| 1 | 1.5 | 96 | 1.1 | Cyclohexane | | | a [1] | 2¾ | 5-10 | 45 | 17 |
| 2 | 1.5 | 96 | 1.2 | ---do--- | | | b [2] | 3 | 5-10 | 44 | 25 |
| 3 | 1.5 | 96 | 1.2 | ---do--- | | | c [3] | 3 | 10-25 | 48 | 18.6 |
| 4 | 1.5 | 96 | 1.2 | ---do--- | $FeCl_3 \cdot 6 H_2O$ | 1 | c | 3 | 10-30 | 52 | 16 |
| 5 | 1.5 | 96 | 0.8 | ---do--- | $Mn(OAc)_2 \cdot 4H_2O$ | 2 | c | 2 | 10-30 | 60 | 0 |
| 6 | 1.5 | 96 | 1.2 | ---do--- | $Mn(OAc)_2 \cdot 4H_2O$ | 1 | c | 3 | 10-30 | 67 | 0 |
| 7 | 1.5 | 96 | 1.0 | ---do--- | $Mn(OAc)_2 \cdot 4H_2O$ | 1 | b | 2½ | 10-30 | 65 | 0 |
| 8 | 1.5 | 96 | 0.6 | ---do--- | $Mn(OAc)_2 \cdot 4H_2O$ | 1 | b | 1 | 10-35 | 50 | 0 |
| 9 | 1.5 | 96 | 1.0 | n-Hexane | $Mn(OAc)_2 \cdot 4H_2O$ | 1 | b | 2½ | 10-30 | 45 | 2 |
| 10 | 1.5 | 96 | 1.2 | Cyclohexane | $Mn(OAc)_2 \cdot 4H_2O$ added after 1½ hr | 1 | b | 3 | 10-25 | 52 | 0 |
| 11 | 1.5 | 96 | 1.0 | ---do--- | $MnSO_4 \cdot H_2O$ | 1 | c | 2½ | 10-30 | 56 | 0 |
| 12 | 1.5 | 96 | 1.2 | ---do--- | $Li_2SO_4 \cdot X H_2O$ | 1 | c | 3 | 10-25 | 52 | 0 |
| 13 | 1.5 | 96 | 1.2 | ---do--- | $CuSO_4 \cdot 5H_2O$ | 1 | c | 3 | 5-20 | 62 | 0 |
| 14 | 1.75 | 96 | 1.2 | ---do--- | $ZnSO_4 \cdot 7H_2O$ | 0.7 | a | 3 | 5-10 | 76 | 0 |
| 15 | 1.5 | 96 | 0.8 | ---do--- | $ZnCl_2$ (anhydrous) | 1 | c | 2 | 10-30 | 54 | 0 |
| 16 | 1.5 | 96 | 1.2 | ---do--- | $CdSO_4$ | 1 | c | 3 | 10-30 | 50 | 0 |
| 17 | 1.5 | 96 | 1.0 | ---do--- | Al (metal) | 1 | c | 2½ | 10-30 | 63 | 0 |
| 18 | 1.5 | 96 | 1.0 | ---do--- | $TiO_2$ | 1 | a | 2½ | 5-10 | 72 | 0 |
| 19 | 1.0 | 96 | 1.2 | ---do--- | $TiO_2$ Acetic Acid-40 | 1 | a | 3 | 15-26 | 42 | 2.8 |
| 20 | 1.0 | 99 | 1.2 | ---do--- | $TiO_2$ 2 grams Span 60 [4] | 1 | b | 3 | 5-10 | 36 | 0 |
| 21 | 1.5 | 96 | 1.2 | ---do--- | $SnCl_2 \cdot 2H_2O$ | 1 | c | 3 | 10-30 | 50 | 0 |
| 22 | 1.5 | 96 | 1.2 | ---do--- | $Cr_2O_3$ | 1 | c | 3 | 10-30 | 54 | 0 |
| 23 | 1.5 | 96 | 1.2 | ---do--- | $CoSO_4 \cdot 7H_2O$ | 1 | c | 3 | 10-30 | 55 | 0 |
| 24 | 1.5 | 96 | 0.8 | ---do--- | $H_2PtCl_6 \cdot 6H_2O$ | 1 | c | 2 | 10-30 | 55 | 0 |
| 25 | 1.5 | 96 | 1.2 | ---do--- | $Na_2SO_4$ | | c | 3 | 10-25 | 57 | 13 |
| 26 | 1.5 | 96 | 1.2 | ---do--- | $NiCl_2 \cdot 6H_2O$ | 1 | c | 2.5 | 10-30 | 56 | 0 |

[1] Standard 500 ml flask stirred by a glass crescent blade attached to a Cenco cone-drive brushless motor.
[2] 500 ml creased (Morton) flask, stirred by a Labline Cruciform Impeller assembly. Stirring speed was 8-10 thousand r.p.m.
[3] A cylindrical reactor with a hemispherical bottom, stirred by a close-fitting, flat, perforated Teflon (polytetrafluoroethylene) blade which was about half the height of the reactor. Four indentations at the top of the vessel decreased swirling during stirring.
[4] Span 60—Sorbitan monostearate.

It is apparent from the foregoing examples that if the conditions of the reaction be kept constant, and a metal catalyst of the invention is added to the reaction mixture, the reaction is directed to the formation of a high ratio of mono-alkyl urea to di-alkyl urea. In many cases, essentially no di-alkyl urea is formed. The process gives excellent yields, and is readily manageable, since the reaction mixture remains reasonably fluid. The process can be carried out without difficulty, in simple equipment, and with only a minimum of skilled attendance.

The above examples and description are to be taken as only illustrative of the invention and a number of its preferred embodiments and it is to be understood that many further variations and modifications of the invention may be made by those skilled in the art without departing from the scope and spirit of the invention which is defined in the appended claims.

What is claimed is:

1. The process for preparing mono alkyl urea which comprises reacting a mono-olefin containing a tertiary olefinic carbon atom with urea in a sulfuric acid medium and in the presence of an ionic metal salt, the cation of which is selected from the group consisting of $Li^+$, $Na^+$, $Cu^{++}$, $Zn^{++}$, $Cd^{++}$, $Al^{+++}$, $Ti^{++++}$, $Sn^{++}$, $Cr^{+++}$, $Ni^{++}$, $Mn^{++}$, $Co^{++}$, and $Pt^{++++}$.

2. A process for preparing mono alkyl ureau which comprises reacting a mono-olefin containing a tertiary olefinic carbon atom with urea in a medium comprising sulfuric acid and a diluent which is inert toward olefins and $Ti^{++++}$, $Sn^{++}$, $Cr^{+++}$, $Ni^{++}$, $Mn^{++}$, $Co^{++}$, and $Pt^{++++}$, wherein the molar ratio of sulfuric acid to urea is from 1.0 to 2.0 and wherein the said diluent comprises at least half the reaction mixture.

5. The process of claim 4 wherein the diluent is selected from the group consisting of methylene dichloride, cyclohexane, and mixtures thereof.

6. The process of claim 4 wherein the catalyst is manganous acetate.

7. The process of claim 4 wherein the catalyst is an ionic salt containing divalent copper.

8. The process of claim 4 wherein the catalyst is an ionic compound containing tetravalent titanium.

9. The process of claim 4 wherein the catalyst is an ionic compound containing trivalent chromium.

10. The process of claim 4 wherein the catalyst is an ionic aluminum salt.

11. The process of claim 4 wherein the olefin is isobutylene.

12. The process of claim 11 wherein the catalyst is manganous acetate.

13. The process of claim 11 wherein the diluent is cyclohexane.

14. The process of claim 13 wherein the catalyst is manganous acetate.

15. The process for preparing N-t-butylurea which comprises reacting isobutylene with urea in a medium comprising sulfuric acid and cyclohexane and in the presence of a catalytic amount of manganous acetate wherein the molar ratio of sulfuric acid to urea is about 1.5 and wherein the cyclohexane comprises at least half of the reaction mixture.

16. The process for preparing N-t-butylurea which comprises reacting isobutylene with urea in a medium comprising sulfuric acid and methylene dichloride and in the presence of a catalytic amount of manganous acetate wherein the molar ratio of sulfuric acid to urea is about 1.5 and wherein the methylene dichloride comprises at least half of the reaction mixture.

No references cited.

ALEX MAZEL, *Primary Examiner.*

HENRY R. JILES, *Assistant Examiner.*